June 28, 1932.  N. M. MARSILIUS  1,865,198
MILLING MACHINE
Filed Feb. 4, 1928  5 Sheets-Sheet 4
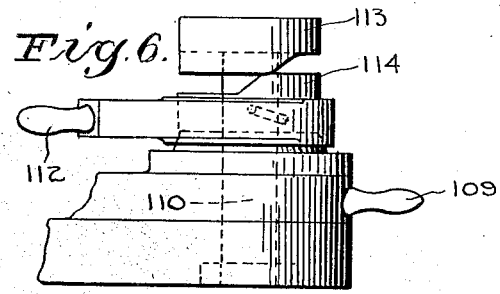
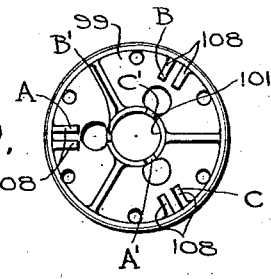
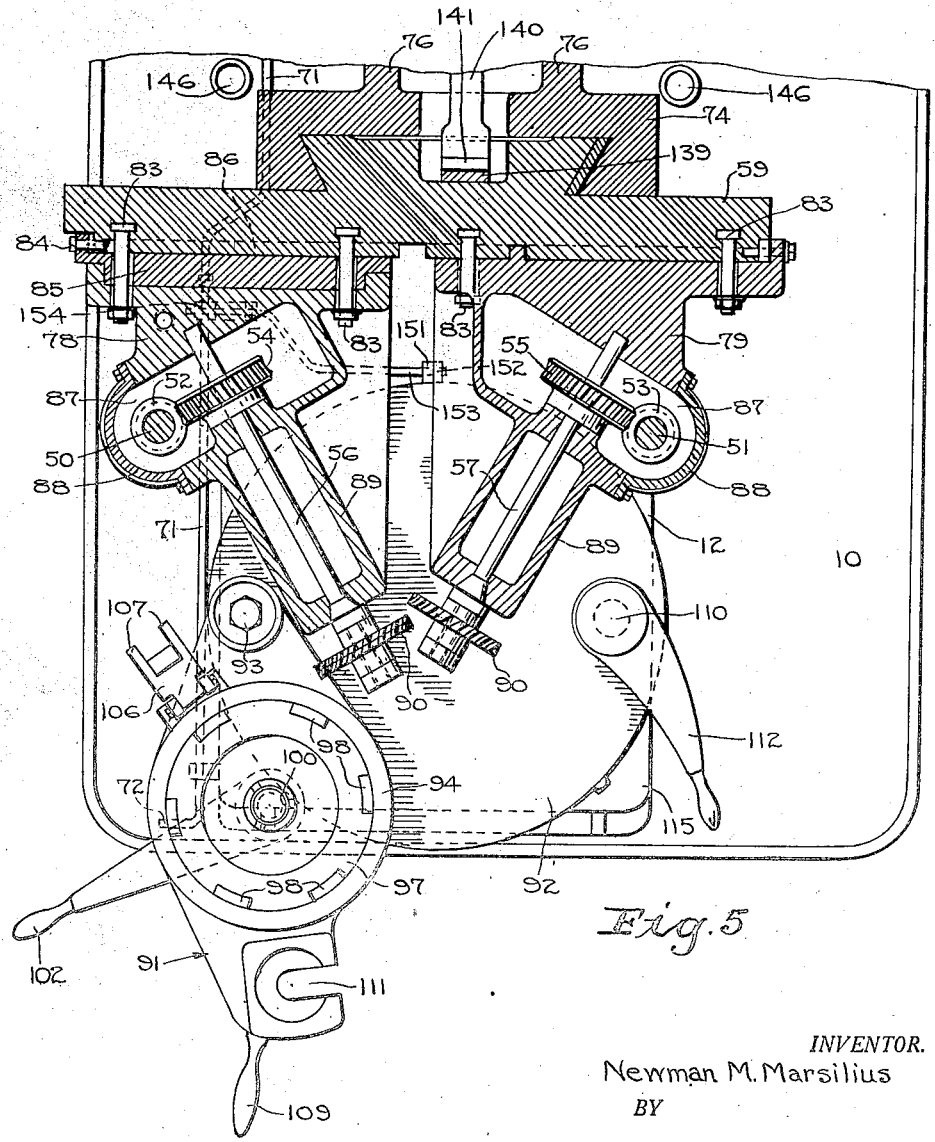
INVENTOR.
Newman M. Marsilius
BY
ATTORNEYS.

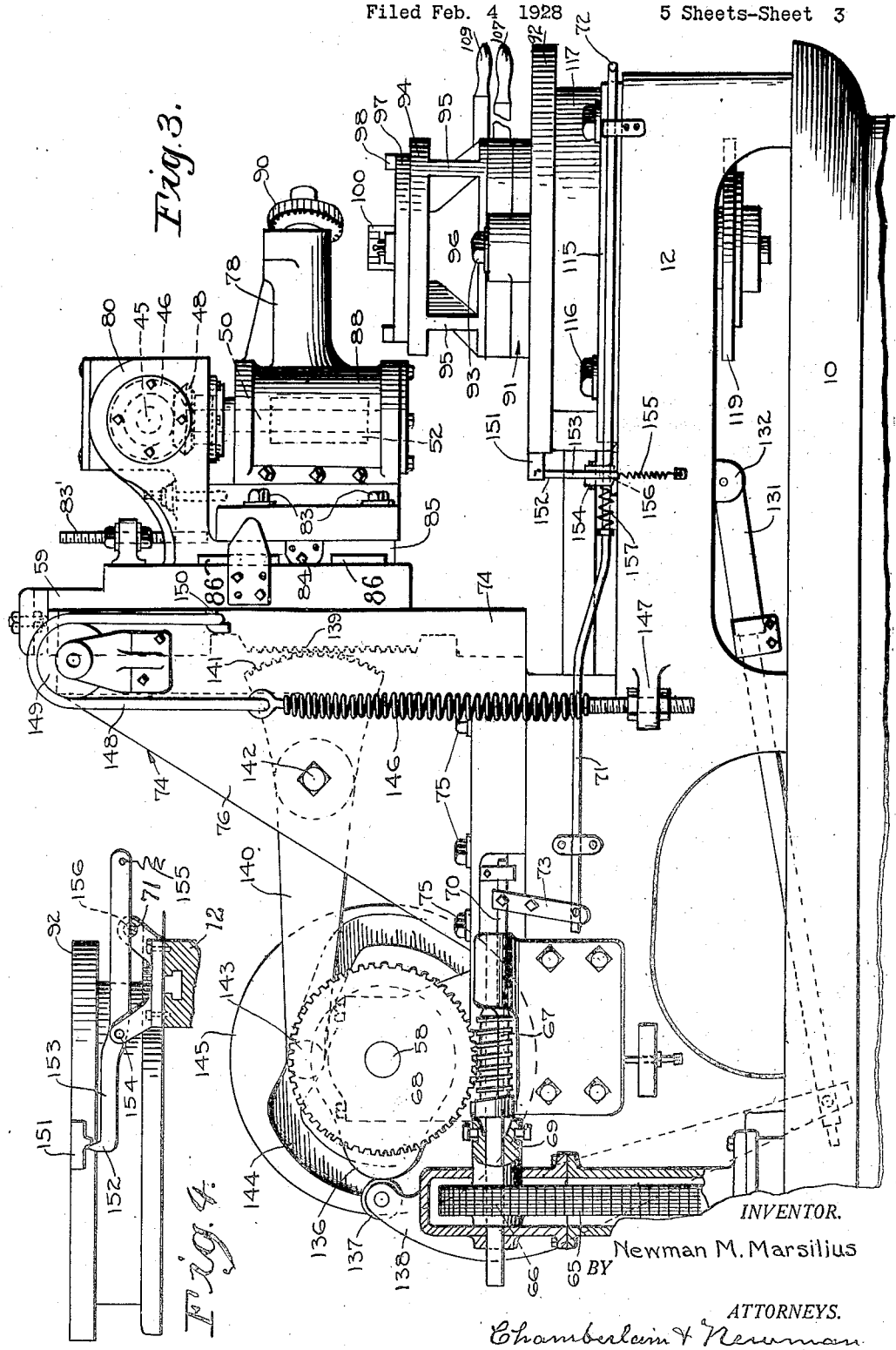

INVENTOR
Newman M. Marsilius
BY
Chamberlain & Newman
ATTORNEY

Patented June 28, 1932

1,865,198

UNITED STATES PATENT OFFICE

NEWMAN M. MARSILIUS, OF BRIDGEPORT, CONNECTICUT, ASSIGNOR, BY MESNE ASSIGNMENTS, TO THE PRODUCTO MACHINE COMPANY, OF BRIDGEPORT, CONNECTICUT, A CORPORATION OF CONNECTICUT

MILLING MACHINE

Application filed February 4, 1928. Serial No. 251,843.

The present invention relates to new and useful improvements in automatic milling machines of the turret station type, the machine being designed for milling parts of various shapes and seeks generally to improve upon that type of machine known as the "Pro-Ducto-Matic". This machine is adapted for production of short cut milling jobs and the present invention comprises improvements on the type of machine shown and described in pending applications, Ser. No. 192,002; filed May 17, 1927 and Ser. No. 236,647, filed Nov. 30, 1927.

A feature of the present invention is to provide a machine that is adapted to use different styles of turrets, work holders and cutters whereby different kinds of milling operations may be performed, including angular cutting for radial milling operations.

A further object of the invention is to provide a milling machine including improved mounting and driving means for the cutters; one wherein a plurality of cutters are arranged on different supports whereby their relative positions may be varied, and wherein the cutter supports also carry gearing for driving the cutters; the supports being in the form of castings having space for housing the gearing.

Other objects of the invention are to provide an improved holder for the work this latter including novel locking means for said holder and means for clamping the work together with a guide means to insure the proper positioning of the work in the holder. Means are also provided whereby the turret carrying the work holder is locked against movement during the milling operation; automatic means being provided for stopping the turret on the completion of a revolution, a manually operable lever being provided for releasing the turret, such lever in its locking position maintaining a clutch in disengaged position whereby the turret mechanism is not driven, said locking lever being manually disengaged from said clutch lever but automatically engaging therewith when said clutch lever is moved on the completion of the revolution of the turret.

With these and other objects in view as will become more apparent from a consideration of the following description taken in connection with the accompanying drawings, the invention resides in certain construction combination and arrangement of parts as will be described. While in the drawings I have shown a satisfactory embodiment of the invention, it is to be understood that this is by way of illustration only and that reference must be had to the annexed claims for a definition of the limitations of the invention.

In the drawings, wherein similar reference characters designate corresponding parts throughout the several views:—

Fig. 3 is a side view looking from the right in Fig. 1, the base of the machine being omitted to enable the upper portion thereof being shown on an enlarged scale;

Fig. 4 is a detail view showing the means for locking the turret and clutch rod;

Fig. 5 is a sectional view showing the construction of holders or supports and the arrangements therein for driving the cutters;

Fig. 6 is a detail view illustrating the means for locking the work holder;

Fig. 9 illustrates a clutch as an article upon which the machine shown is adapted to operate.

Figure 1:
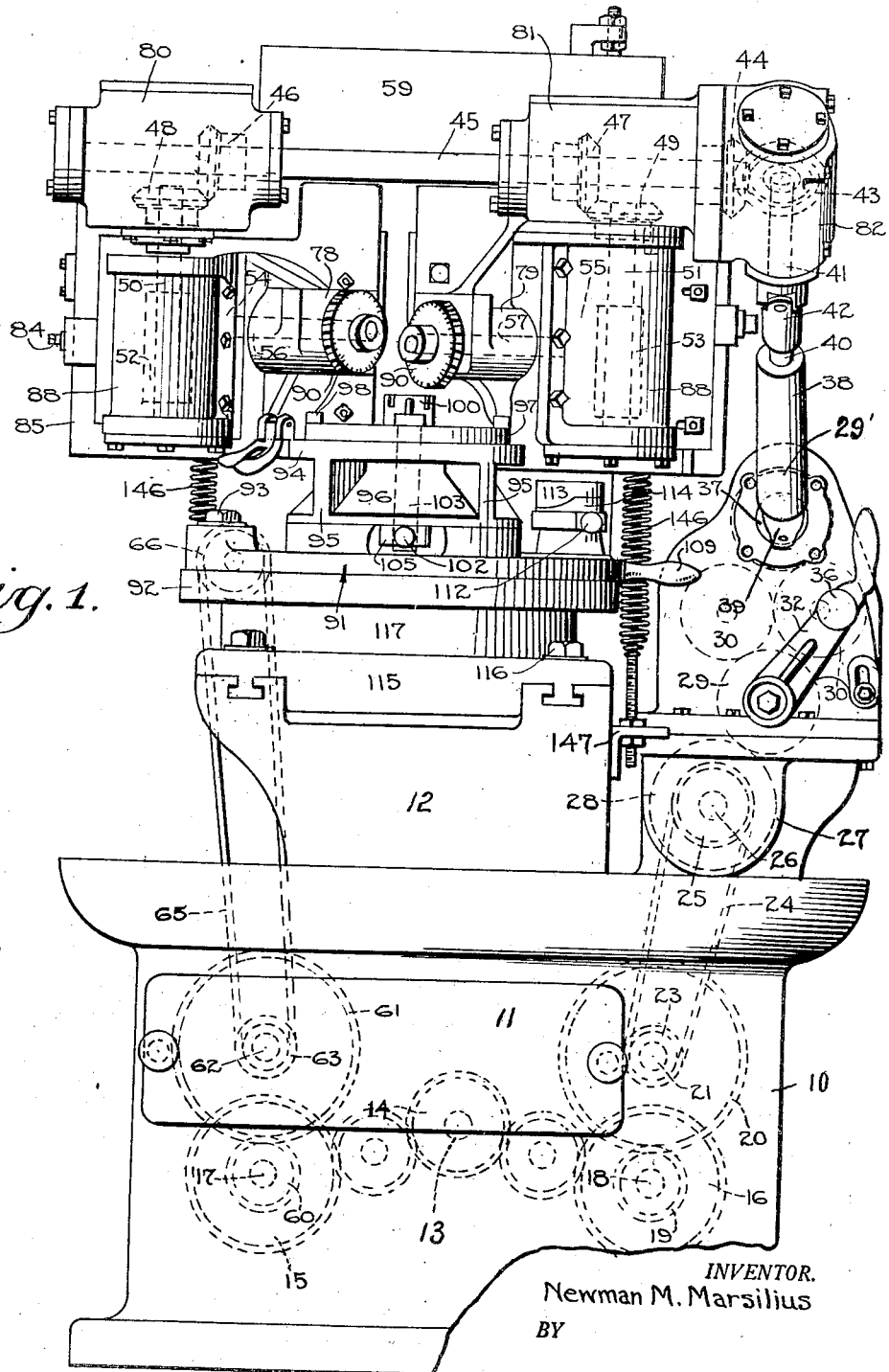
Fig. 1 is a front elevational view of my improved milling machine.
Figure 2:
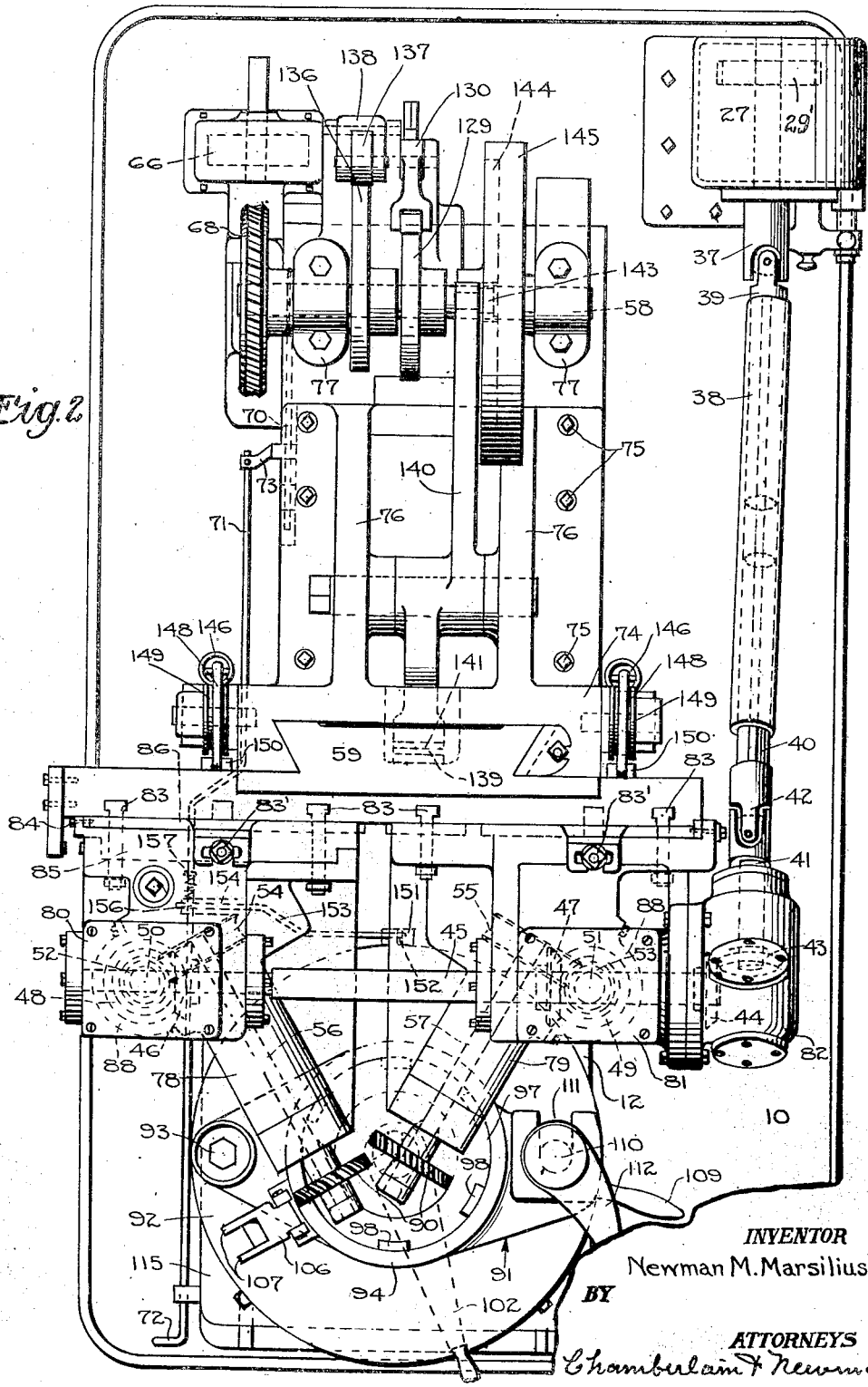
Fig. 2 is a plan view thereof.
Figure 7:
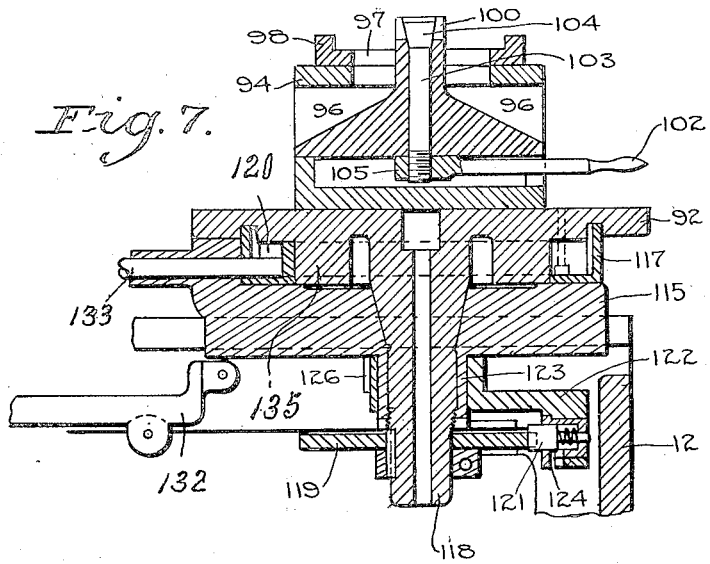
Fig. 7 is a vertical section through the turret and work holder.

Referring in detail to the drawings, 10 indicates a base in the form of a casting of suitable height and weight and having at its forward end a compartment to which access is had through door 11. This compartment catches the chips from the milling operations. Mounted on base 10 is a table 12 and this table with the base carries all the operating mechanism so that the machine is self contained. A motor, not shown, is arranged centrally of the base and power from its shaft 13 is distributed through suitable gearing as will now be described.

The shaft 13 of the motor carries a gear 14 that is connected through idler gears to drive gears 15 and 16 arranged at opposite sides of the motor shaft on shafts 17 and 18. Power from gear 15 through a suitable train of means, is utilized to operate a cam shaft while the milling cutters are driven by power taken from the motor shaft by gear 16.

For the cutters, the drive is through gear 19 to gear 20 on shaft 21 on which is a sprocket 23 which through a chain 24 and sprocket 25 serves to drive a shaft 26. As shown, the shaft is disposed within the lower section 27 of a gear casing mounted on base 10.

In addition to the sprocket 25 the shaft 26 carries a gear 28 meshing with and driving a gear 29 arranged within the upper portion 27' of the casing and which also contains change gears 30 whereby the direction of rotation of the gear 29' and cutters may be reversed.

Disposed on one side of the gear casing 27' is an operating lever 32 mounted to shift the change gears 30 into driving relation with gear 29' to change the direction of drive, a locking pin 36 being provided to enter notches (not shown) in the casing in a way to hold the change gears in their adjusted positions.

Gear 29' is secured to and drives a shaft 37 connected to drive a tubular shaft 38 through a universal joint 39. This tubular shaft is slidably mounted upon a splined shaft 40 connected to a short shaft 41 by means of a second universal joint 42. Shaft 41 has a bearing in a cutter slide, later to be described, and carries a beveled gear 43 meshing with and driving a second beveled gear 44 mounted on a shaft 45 extending transversely of the machine. Mounted on shaft 45 are beveled gears 46 and 47 meshing with and driving beveled gears 48 and 49 on vertical shafts 50 and 51. These vertical shafts 50 and 51 carry worms 52 and 53 meshing with and driving worm gears 54 and 55 on the cutter shafts 56 and 57.

The drive for the cam shaft 58 which indexes and locks the turret and operates the vertically reciprocatory cutter slide 59, is through the gear 60 to a relatively larger gear 61 on a shaft 62 carrying a sprocket 63 which through chain 65 and a sprocket 66 drives a worm 67 meshing with and driving a worm wheel 68 on cam shaft 58. A clutch 69 is interposed between sprocket 66 and worm 67 and is controllable through slidable rods 70 and 71, the latter of which extends to the front of the machine and is provided with a handle portion 72. A short link 73 pivoted intermediate its ends connects the adjacent ends of the rods 70 and 71 in such manner that longitudinal movement may be imparted to one of the rods by the other to shift the clutch. Means are provided for securing the rod 71 to hold the clutch disconnected at predetermined times as will be hereinafter more fully described.

Table 12 carries an upright 74 that is adjustably mounted on the rear portion of the table by means of bolts 75. This upright includes reinforcing ribs 76 and the front of the upright is provided with a dovetailed recess to provide ways for slidably receiving the cutter slide 59. Cam shaft 58 is mounted in bearing 77 at the rear of the table.

Disposed on the forward side of slide 59 are a pair of cutter carriers 78 and 79. These carriers are substantially the same and disposed on the upper side of each of the cutter carriers is gear casing 80 and 81 to house the respective pairs of gears 46 and 48 and 47 and 49. The casing 81 communicates with a casing 82 for the gears 43 and 44. Owing to the universal joints and the sliding connection between the tubular and splined shafts, the shaft 45 may be driven in any of its various positions and through gearing previously described, drive the cutter shafts.

The carriers 78 and 79 may be adjusted vertically of the slide 59 since they are connected thereto by means of T bolts 83 operating in slots in the slide. Screws 83' are provided to assist in effecting the adjustment. In addition to this adjustment, the carrier 78 may be adjusted laterally of the slide by means of a screw 84. This adjustment may be made since the filler 85 is interposed between the slide and carrier and has a portion operating in way 86 in the slide.

In addition to the adjustments already described, the carrier 78 may be adjusted vertically relative to the carrier 79. This is probably best shown in Fig. 1, wherein it may be noted that carrier 78 is shown slightly above the carrier 79. The length of worm 52 is such that the worm wheel 54 will remain in mesh with it since the adjustment is slight.

Each of the cutter carriers includes a hollow portion 87 providing a casing for the worm and the worm gear 52 and 53 and 54 and 55. Access to the casings is had by removing closures 88. Projecting forwardly from these hollow portions and at an angle to each other are a pair of tubular extensions 89 and mounted in these extensions are the cutter shafts 56 and 57. Since the extensions are arranged at an angle to each other the cutter shafts being disposed centrally of the extensions and having bearings in each of the ends thereof are likewise arranged at an angle to each other. Owing to this arrangement, the cutters 90 are so disposed that one operates on the work in advance of the other as will be described, but can be made to work simultaneously if necessary.

The work holder includes a frame 91 pivotally secured to a turret 92 as at 93. The frame includes a work holding portion 94 supported upon uprights or legs 95 whereby a space is provided about the central inclined portion 96 for the passage of chips. Portion 94 includes a ring 97 and lugs 98 to receive and centrally locate the work. In the present instance the work is a clutch plate 99 (Fig. 9) and its peripheral portion is adapted to rest on the lugs 98.

At the upper central portion of the cone-shaped portion 96 is a split sleeve 100 adapted to enter the central sleeve 101 of the plate 99. Sleeve 100 is adapted to secure the work in position. This is accomplished by operating lever 102 to draw down on rod 103 whereby its cone portion 104 spreads the split sleeve 100. The lever 102 carries a nut 105 having screw thread connection with the rod 103 whereby rotation of the lever causes vertical movement of the rod.

In Fig. 5 the work holder is shown in loading and unloading position. A work locating or positioning means 106 is pivoted to the portion 94 and is adapted to be swung over the holder with its fingers 107 disposed one at each side of a pair of the ears 108 on the clutch plate 99. The holder 91 is then swung inwardly by its handle 109 to position the pin 110 in the slot 111. After this, by turning handle 112, the cam portions 113 and 114 co-act to lock the holder 91 in position relative to the cutters 90.

The turret 92 is mounted upon the table through a bearing plate 115 which is adjustably mounted on the table. To this end longitudinally disposed T slots are provided in which the heads of T bolts 116 are slidably disposed. A bearing plate is also provided and has an upstanding annular flange 117 which serves to prevent chips from getting into the bearing parts of the machine. The turret includes a central depending spindle 118 journaled in the bearing plate 115.

A ratchet disc 119 is secured to the lower end of the spindle 18 and in the present instance is provided with three notches 120 for engagement by a spring actuated pawl 121 carried in the outer end portion of a rocker arm 122 journaled upon a cylindrical extension 123 of the bearing plate. The spring actuated pawl 121 is positioned to slide upon a peripheral face of the ratchet disc 119 and is for the purpose of engaging, from time to time, the several notches of the disc in a way to rotate the same through a movement of the rocker arm. The pawl is provided with a pin 124 to engage the cam edge $a$ of a bracket 125 secured to the bearing plate 115, which engagement takes place during the extreme forward movement of said rocker arm 122 and is for the purpose of drawing the pawl 121 from the notch 120 with the completion of a one-third rotation of the ratchet and its turret.

Figure 8:
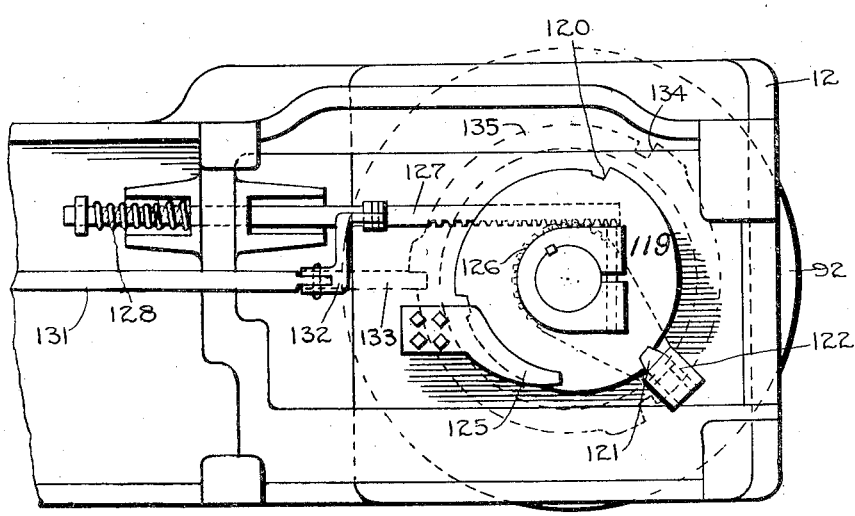
Fig. 8 is a bottom plan view showing the indexing means.

The inner or hub portion of the arm 122 is provided with peripheral rack 126 that is engaged and operated by a longitudinally disposed rack-bar 127 slidably mounted in suitable bearings of the support and is provided with a spring 128 whereby the said rack and arm are normally held in the position shown in Fig. 8, which represents a stationed or rest position of turret during the time the milling operations are taking place. This rack is connected to be operated from a cam 129 on the cam shaft 58, through a lever 130. The lower end of said lever operates a slide rod 131 (Fig. 8) slidably mounted and connected by a link 132 with the rack bar 127. This line of connection serves to impart feeding movement to the turret from the cam against the action of spring 128. Obviously this operation is properly timed to cause the indexing of the turret to occur between the milling operations.

The turret is locked in its stationed positions to hold it rigid during the milling operation. This is accomplished by means of a rod 133 engaging notches 134 of a ring 135 secured to the turret 92. Said rod is forced into the notches by the action of a cam 136 acting on roller 137 carried by a lever 138. A spring is provided to withdraw the rod from the notches upon the pressure exerted by the cam being released.

The rear of the cutter slide carries a rack 139 preferably formed of steel and secured to the slide in any suitable manner. To provide for vertical reciprocation of the slide during operation of the machine, a lever 140 carrying teeth 141 is pivotally mounted as at 142 between the re-enforcing ribs 76. The teeth 141 engage the teeth of rack 139 and the rear end of the lever 140 carries a roller 143 engaging in the cam groove 144 of the cam 145 secured to the shaft 58 and acting to rock the lever 140 on its pivot 142 to reciprocate the slide. A pair of coil springs 146 disposed at opposite sides of the upright and anchored to the table 12 as at 147 are secured to flexible elements 148 extending over pulleys or rollers 149 on the upright, the other ends of the elements being connected to the slide as at 150. These springs tend normally to move the slide upwardly and thereby assist the operation of the lever 140 and its associated parts.

From the foregoing description it is believed that most of the operation of the machine will be apparent, however, the turret 92 carries a lug or projection 151 adapted to be engaged by the hooked end 152 of a lever 153. This lever is pivoted intermediate its ends at 154 and crosses the rod 71. A spring 155 normally maintains the lever in engagement with the rod and the rod has a notch 156 into which the lever enters to prevent longitudinal movement of the rod. A spring 157 is coiled about the rod and upon the projection 151 engaging and rocking the lever 153, said spring acts to move the rod to shift the clutch 69 and discontinue the driving of the cam shaft. This operation will take place upon the completion of one revolution by the turret, a complete revolution of the turret being necessary to complete the operations on the clutch plate shown in Fig. 9. Movement of the lever 153 is against the action of the spring 155 and this spring serves to bring the lever down onto the rod 71 as soon as the lug 51 passes the end 52 of the lever. To again engage the clutch 69 it is but necessary to shift rod 71 through handle 72 so that lever 153 again engages in notch 156 in the rod.

During the operation of milling a clutch plate, one of the cutters 90 engages between the pair of ears A while the other cutter is milling the notch A'. At the next station one of the cutters is milling between the ears B while the other cutter is milling the notch B'. At the third station the first cutter is milling between the ears C while the second cutter is milling the notch C'.

Having thus described my invention what I claim is:—

1. In a milling machine a reciprocatory slide, a cutter carrier slidably and adjustably mounted on said reciprocatory slide, two shafts mounted by said carrier and angularly disposed relatively, means for driving one of said shafts, means whereby said driven shaft drives the other shaft, a worm on said other shaft, a cutter carrying shaft mounted by said carrier, and a worm gear on said cutter carrying shaft and meshing with said worm.

2. In a milling machine, a vertical guide way, a slide mounted in said guide way, means to reciprocate said slide in a vertical plane, a pair of cutter carriers on said slide, said cutter carriers each comprising hollow vertical and horizontal portions and being adjustable relatively on the slide, a shaft in the hollow vertical portion of each of said carriers, means for driving each of said shafts, a shaft in the hollow horizontal portion of each of said carriers, gearing connecting the shafts of the horizontal portions with the shafts of the respective vertical portions, and cutters carried by the horizontal shafts.

3. In a milling machine, a vertically reciprocatory slide, means to reciprocate said slide, said means comprising a rack on the rear of the slide, a lever pivoted intermediate its ends, means to rock the lever, and a gear segment on one end of the lever and meshing with the rack, cutter carriers on the front of said slide, said carriers vertically and slidably adjustable on said slide, and each of said carriers comprising vertical and horizontal hollow portions forming gear casings and a portion projecting from the vertical hollow portion and forming a mounting for a cutter carrying shaft.

4. A cutter carrier for milling machines, the same comprising a mounting; a vertically disposed hollow portion carried by said mounting, a horizontally disposed hollow portion disposed above said vertically disposed hollow portion, a hollow cutter support projecting from the vertically disposed hollow portion, a shaft projecting into the horizontally disposed hollow portion, a vertically disposed shaft in said vertically disposed hollow portion and extending into the horizontal portion, a gear drive between said shafts, a worm on the shaft within the vertical portion, a shaft extending through the hollow cutter support and having one end arranged in the vertical portion, a worm gear on the cutter shaft and meshing with and driven by the worm on the vertical shaft, and a cutter on said cutter shaft.

5. In a milling machine, a turret, means for indexing the turret, means for locking the turret during the milling operation, means including a clutch for driving the indexing means, means for shifting said clutch to discontinue the drive of the indexing means, locking means co-operating with said clutch shifting means for automatically locking the same against shifting operation, means on the turret for operating the locking means to permit operation of the shifting means, and said turret locking means acting to lock the turret against movement upon said shifting means being moved to shift the clutch to render the indexing mechanism inoperative.

6. In a milling machine, a reciprocatory slide, means to reciprocate said slide, a pair of independent cutter carriers on said slide and independently adjustable thereon, said cutter carriers each comprising hollow vertical and horizontal portions, a shaft in the hollow vertical portion of each of said carriers, a driven shaft extending into the hollow horizontal portion of each of the carriers, means for driving said driven shaft, a driving connection between said driven shaft and each of the vertical shafts, a projecting cutter support extending from each of the vertical hollow portions, a cutter shaft extending through each of said projecting cutter supports, gearing between the vertical shafts and the shaft in the projecting cutter supports, and cutters carried by said cutter shafts.

Signed at Bridgeport, in the county of Fairfield and State of Connecticut, this 27th day of January, A. D. 1928.

NEWMAN M. MARSILIUS.